April 1, 1969 — H. WILCKEN — 3,435,490
HELICAL COIL TYPE SLIDE FASTENER
Filed Jan. 17, 1966 — Sheet 1 of 2
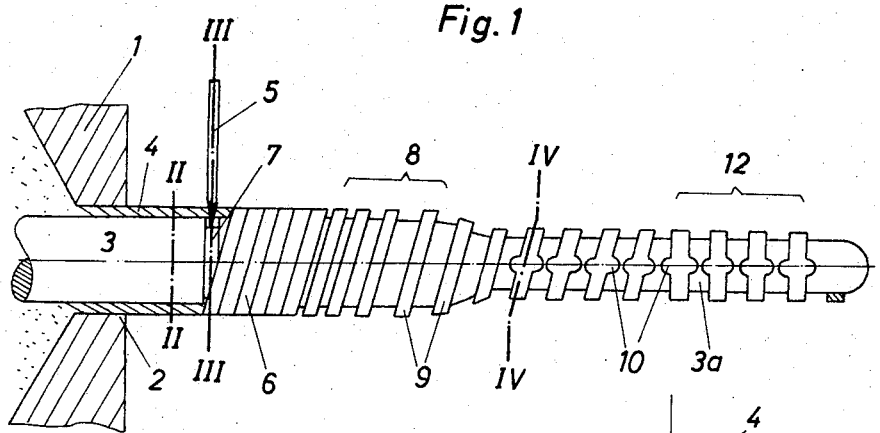
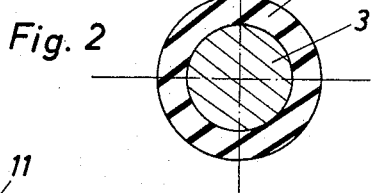
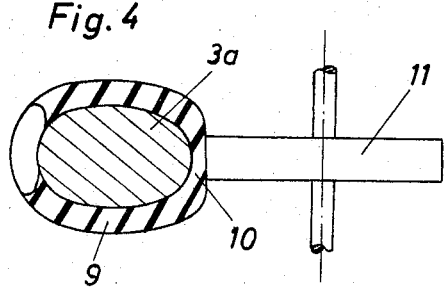
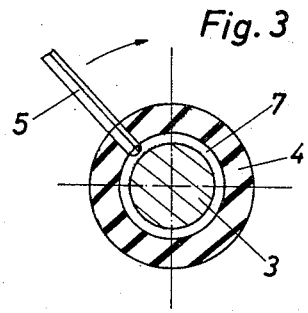
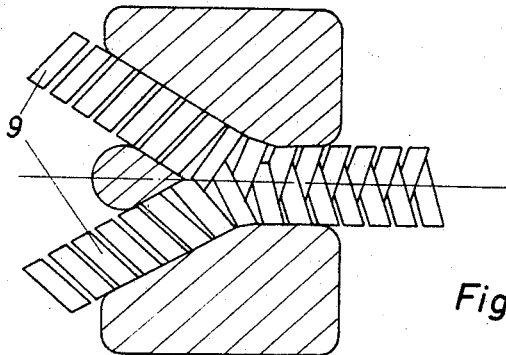
Hugo Wilcken
INVENTOR.
BY Karl G. Ross
Attorney

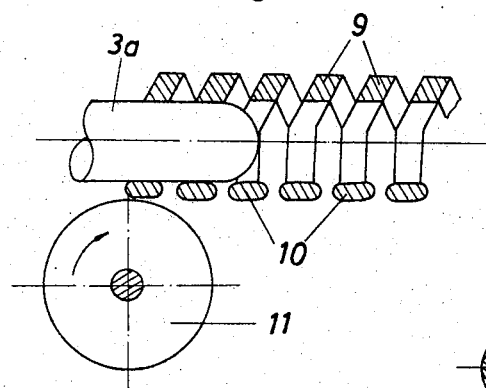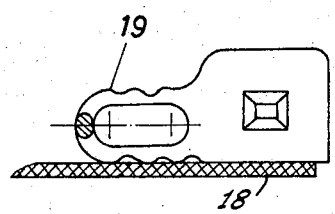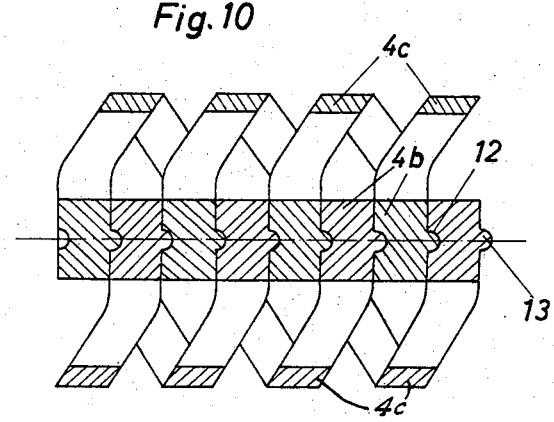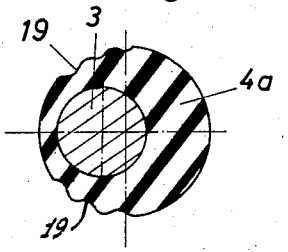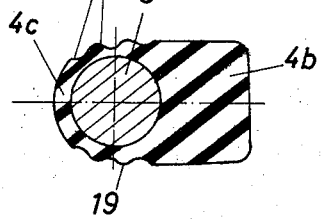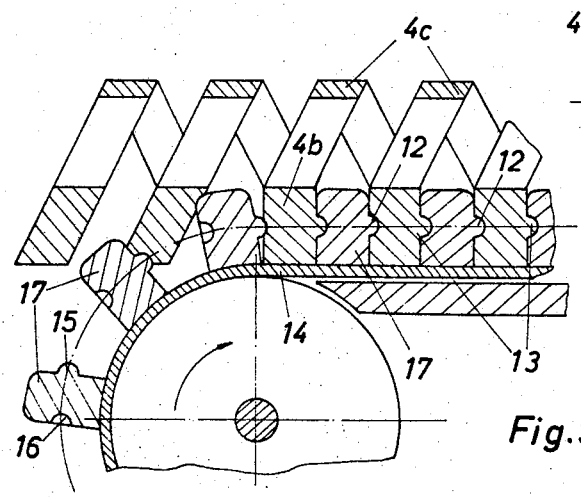

United States Patent Office 3,435,490
Patented Apr. 1, 1969

3,435,490
HELICAL COIL TYPE SLIDE FASTENER
Hugo Wilcken, Curau, near Lubeck, Germany
Filed Jan. 17, 1966, Ser. No. 520,999
Claims priority, application Germany, Jan. 19, 1965,
W 38,372
Int. Cl. A44b *19/10*
U.S. Cl. 24—205.13         4 Claims

ABSTRACT OF THE DISCLOSURE

In a convoluted slide-fastener member, a thermoplastic tube of eccentric cross-section is continuously extruded and helically slitted to form a coil, with subsequent spreading-apart of the turns thereof. The heavy portion of each turn is then reshaped and thereby provided with coupling formations adapted to interlink with corresponding formations on a complementary coil.

---

This invention relates to a method and an apparatus for producing a continuous, helically wound slide-fastener coil of thermoplastic material and to a helically wound slide-fastener coil of thermoplastic material made according to such method.

Helically wound spring-like slide-fastener coils are known in which a thread or wire of thermoplastic material having any desired cross-sectional configuration is wound to a coil. The convolutions of these helical springs are spaced to the proper pitch and are provided along one longitudinal side with deformations of the thread serving as coupling means, and are finally sewn to a supporting tape, so as to form one half of a slide-fastener.

The principal object of this invention is to provide a winding apparatus which greatly simplifies the production of such helical slide-fastener coils as compared to the hitherto common practice, and to facilitate the selection of any radial thickness of the helical coil convolutions.

Another object of this invention is to provide continuous helically wound slide-fastener coils of thermoplastic material having a coupling head on each convolution, similar to the well known metallic individual coupling members which are straddling and clamped to the edge of the tape and which include a coupling lug on one longitudinally directed surface and a mating recess on the opposite surface.

The method according to the invention for producing a slide-fastener member in the form of a helical coil comprises the steps of extruding thermoplastic material in the form of a tube over a mandrel, helically cutting the tube by a rotating knife, spacing the convolutions to the proper pitch required for the coupling engagement, and deforming predetermined zones of the convolutions to produce the coupling formations.

According to another advantageous method step, the tube of thermoplastic material is extruded eccentrically and formed with a coupling-head zone on one side. In this way it is possible to provide one longitudinally directed surface with coupling recesses and the opposite surface with coupling projections, as will be described in detail later.

The method according to the invention allows a most simple production of spring-like helical slide fastener coils and in addition makes it possible to profile the continuous convolutions of the coil, practically in a configuration similar to that of the aforementioned individual metallic member, thereby achieving a particularly effective protection against unintended release of two such coupled slide-fastener coils each attached to a stringer tape, for example by sewing.

The method according to the invention and the apparatus for carrying out the method shall now be described in connection with the attached drawings in which:

FIG. 1 is a diagrammatic side view partly in section of an extruder nozzle for producing the tube, showing the different steps of producing a helical slide-fastener coil from the tube;

FIG. 2 is a cross-sectional view in the plane of line II—II in FIG. 1;

FIG. 3 is a cross-sectional view in the plane of line III—III in FIG. 1;

FIG. 4 is a cross-sectional view of the plane of line IV—IV in FIG. 1;

FIG. 5 is a top view of two engaging coils with opposite convolutions made according to the invention;

FIG. 6 is a cross-sectional view similar to FIG. 2, in which the extruded tube has a varying wall thickness;

FIG. 7 is another cross-sectional view similar to FIG. 2, in which the extruded profiled tube is provided with a coupling-head zone;

FIG. 8 shows a device for shaping the coupling formations on a coil made according to the invention;

FIG. 9 is a partial cross-sectional view of a device for shaping the coupling formations of a coil made from the profiled tube shown in FIG. 7;

FIG. 10 is a partial sectional view of two engaging coils provided with coupling formations according to FIG. 9; and FIG. 11 is a face view of one of the convolutions of a coil as shown in FIGS. 9 and 10.

For making simple helical slide-fastener coils out of a suitable thermoplastic material, the method steps according to FIG. 1, are for example, as follows:

A tube 4 of a suitable thermoplastic material is extruded through the nozzle opening 2 of an extruder 1, so as to surround a mandrel 3 which forms a core having, according to FIG. 2, a symmetrical circular cross-section extending towards the nozzle opening 2. The plastic tube 4 discharged from the nozzle opening 2 is, if required, cooled to decrease its degree of plasticity and is then, according to FIG. 3, slit by a knife 5, rotating around the axis of the mandrel 3, to a coil in accordance with the discharge velocity of the tube at the extruder nozzle and in accordance with the desired width of the convolutions in longitudinal direction as shown at 6 in FIG. 1. Preferably the mandrel 3 has a circumferentially extending groove 7 provided in the zone of the rotating knife 5 so that a cut fully extending through the wall of the tube is achieved. The helically cut tube 6 is then engaged by a screw conveyor having projections of increasing width engaging between the convolutions, thereby providing and maintaining the required pitch of the convolutions, and this spread condition of the convolutions is shown at 8 in FIG. 1.

Now, it is possible to proceed in such a manner that the thus formed convolutions 9 are provided with deformations along a generatrix or longitudinally extending line, so as to form coupling surfaces 10. This may be accomplished in different ways, for example, in that the convolutions 9 of the coil according to FIG. 4 are urged by a rotating roller 11, or the like, against an extension 3a of mandrel 3, whereby the convolutions are flattened and widened in longitudinal direction in the pressure zone of the roller 11 (or a ram) so as to form the required coupling surfaces 10. In this connection it is advantageous to support the mandrel extension 3a opposite the direction of pressure exerted by the roller 11 since the mandrel is of small dimensions on account of the delicate slide-fastener coil.

Further, it may be of advantage for reasons of subsequent connection of the coil to a stringer tape to flatten the initially circular convolutions. This may be achieved very simply in such a manner that the mandrel changes from the circular cross-sectional shape to a flattened, or oval cross-sectional configuration at its extension 3a. In this case the deformations forming the coupling surfaces 10 are disposed at the narrow side of the convolutions, as shown in FIG. 4. Finally, the convolution portions provided with the coupling deformations 10 may, by using suitable means, be straightened in planes perpendicular to the longitudinal direction, thereby improving the subsequent coupling engagement of the two slide-fastener coils.

According to the invention it is also possible to terminate the production steps of the slide fastener-coil either at the stage 8 (FIG. 1) or after the oval deformation of the coil, and then to use two such coils with oppositely oriented convolutions as shown in FIG. 5 which may be engaged by a slider, in which case it may be advantageous to apply heat, so as to achieve a desired coupling deformation of the convolutions when the coils engage each other, whereby also any inner stresses within the material may be relieved.

The method according to the invention for producing helical slide-fastener coils evidently allows to extrude a tube having varying wall thickness, which is of great importance, since in this manner special convolution profiles of the helical slide-fastener coils may be produced.

According to FIG. 6, showing a modified cross-sectional profile, the mandrel 3 of circular cross-sectional shape is eccentrically displaced in the opening 2 of the extruder nozzle whose profile may be circular, flattened, or shaped in any other suitable way. In this case a tube is formed with a thickened wall portion 4a which, after helical cutting of the tube to form a coil and spreading of the convolutions, can be provided with coupling surfaces widened in longitudinal direction of the coil by deformations according to the example shown in FIG. 4. However, it is also possible to provide the side walls opposite the thickened portions 4a of the convolutions with coupling means, for example projections and recesses.

In case this latter type of coupling means is desired, in analogy with the commonly used metal locking member which are especially satisfactory and safe against tearing open, it is advantageous to extrude a tube having a cross-sectional profile as shown in FIG. 7, which practically corresponds to the shape of the well known metal locking members with a flat narrow head 4b and an annular portion 4c encompassing the mandrel 3. Again, this tube 4b, 4c is cut to form a helical coil, as explained in connection with FIG. 1, in which case the rotating knife 5 is somewhat subjected to eccentric forces, but this is hardly noticeable since the tube is cut when the condition of the tube material is more or less plastic moreover, the tube profile may be supported by a guide fitting the outer profile.

The cut tube according to FIG. 6 assumes, after spreading of the convolutions, the shape shown in the partial longitudinal cross-sectional view of FIG. 8, and has preferably a flattened coil profile in which the convolutions 9 are again provided, as explained in connection with FIG. 4, with flattened and widened portions 10 forming coupling heads on parts of each turn extend in radial planes of the coil, as shown in the right-hand portion of FIG. 8, so that the full pitch of the convolutions appears at the remaining peripheral portion disposed opposite the coupling heads 10.

If a tube having the profile 4b, 4c according to FIG. 7 is extruded and then cut in the form of a helical spring, then a slide-fastener coil with an unsymmetrical longitudinal section according to FIG. 9 is obtained. Now the lateral surfaces of the heads of the convolutions facing in opposite longitudinal directions may be provided on one side with recesses 12 and on the other side with corresponding projections 13 in order to provide coupling surfaces, and the head portions 4b may be straightened to extend in radial planes, as shown in FIG. 9. This may, according to one example, be achieved in such a way that a rotating endless conveyor 14 is provided with lugs 17 spaced according to the pitch of the convolutions of the coil and extending radially in planes normal to the direction of advance, the lugs being formed on lateral opposite surfaces with projections 15 and recesses 16; upon suitably deflecting the coil as well as the conveyor, the lugs 17 enter between the convolution of the coil, thereby straightening the convolutions in the zones of the head portions 4b by applying a corresponding alial pressure to position them in radial planes while simultaneously shaping the projections 13 and recesses 12 of the head portions 4b of the convolutions by means of their projections 15 and recesses 16. If the head portions 4b of the coil are thus straightened, and if a pair of such coils are brought into meshing relation by means of a slider, as shown in FIG. 10, the remaining convolution portions 4c of one coil, which account for the full pitch of a winding, effectively form abutments for the heads of the other coil, so that the projections 13 and the recesses 12 of the pair of coils must automatically engage each other when they are brought into mesh with each other so that faulty intermeshing cannot occur.

The slide-fastener coils made according to the invention may be attached to respective tapes 18, FIG. 11, either separately or in intermeshing relationship, for example by sewing, welding, or the like. To this end it is also possible to proceed in such a way that the convolution portions 4c which define the full pitch of a winding, are deformed in suitable guide means by pressure rollers, rams, or the like, as shown at FIGS. 4 and 8, whereupon this deformed portion 4c is sewn onto a tape. In order positively to maintain the threads of the stitches at the side of the deformed convolution portions 4c remote of the tape 18, these convolution portions are provided with grooves or the like extending in longitudinal direction of the coil. In FIGS. 6, 7 and 11 the grooves are shown at 19. These longitudinal grooves can be made in a most simple manner in that it is merely necessary to provide toothlike or corrugated projections at the inner circumference of the extrusion nozzle 2 whereby the extruded tube is automatically grooved. It will be appreciated that the threads of the stitches are safeguarded against lateral sliding off by these longitudinally extending grooves, or the like, when the coil is sewn onto to the tape 18.

What I claim is:

1. A slide-fastener member comprising a coil of thermoplastic material with helicoidal turns progressively increasing and decreasing in radial thickness over an arc of 360°, the thickest portions of said turns being provided with coupling formations adapted to engage corresponding formations on a complementary coil.

2. A slide-fastener member as defined in claim 1 wherein the thicker portion of each turn lies in a substantially radial plane.

3. A slide-fastener member as defined in claim 2 wherein said coupling formation are complementary depressions and projections on opposite sides of said thicker portions.

4. A slide-fastener member as defined in claim 1 wherein said turns are provided with longitudinal peripheral grooves along their thinner portions.

References Cited

UNITED STATES PATENTS

| | | |
|---|---|---|
| 1,956,575 | 5/1934 | Hinsley. |
| 2,597,975 | 5/1952 | Colombo _____ 264—290 X |
| 3,086,246 | 4/1963 | Stone. |
| 3,128,518 | 4/1964 | Steingrubner _____ 24—205.13 |
| 3,137,036 | 6/1964 | Bashover _____ 264—296 X |
| 3,229,006 | 1/1966 | Nohl _____ 264—209 X |
| 3,243,489 | 3/1966 | Porepp _____ 264—296 |

FOREIGN PATENTS 197,764  5/1958  Austria.

BERNARD A. GELAK, *Primary Examiner.*

U.S. Cl. X.R.

24—205.1